United States Patent [19]

Bylander

[11] Patent Number: 5,381,498
[45] Date of Patent: Jan. 10, 1995

[54] MODULAR MULTIFIBER CONNECTOR WITH PHONE-LIKE PLUG AND SOCKET

[75] Inventor: James R. Bylander, Austin, Tex.

[73] Assignee: Minnesota Mining and Manufacturing Company, St. Paul, Minn.

[21] Appl. No.: 122,119

[22] Filed: Sep. 16, 1993

[51] Int. Cl.⁶ .............................. G02B 6/00; G02B 6/36
[52] U.S. Cl. .......................................... 385/83; 385/87
[58] Field of Search ................................ 385/83–87, 385/75–78

[56] References Cited

U.S. PATENT DOCUMENTS

| | | | |
|---|---|---|---|
| 4,028,162 | 6/1977 | Cherin et al. | 156/158 |
| 4,045,121 | 8/1977 | Clark | 350/96 |
| 4,181,400 | 1/1980 | Malsot et al. | 385/83 |
| 4,290,664 | 9/1981 | Davis et al. | 339/156 |
| 4,418,983 | 12/1983 | Bowen et al. | 385/83 X |
| 4,562,632 | 1/1986 | Parchet et al. | 385/83 X |
| 4,735,479 | 4/1988 | Nicholls | 385/83 |
| 4,863,393 | 9/1989 | Ward et al. | 439/188 |
| 4,986,626 | 1/1991 | Bossard | 350/96.2 |
| 5,101,463 | 3/1992 | Cubukciyan et al. | 385/72 |
| 5,151,964 | 9/1992 | Carpenter et al. | 385/81 |
| 5,159,655 | 10/1992 | Ziebol et al. | 385/81 |
| 5,175,776 | 12/1992 | Lee | 385/16 |
| 5,199,093 | 3/1993 | Longhurst | 385/88 |
| 5,214,730 | 5/1993 | Nagasawa et al. | 385/59 |

FOREIGN PATENT DOCUMENTS

514722A1  11/1992  European Pat. Off. ....... G02B 6/38

Primary Examiner—Akm E. Ullah
Attorney, Agent, or Firm—Gary L. Griswold; Walter N. Kirn; Jack V. Musgrove

[57] ABSTRACT

A modular, multifiber connector comprising a plug and a receptacle whose outward appearance and installation is similar to a convention RJ45 jack for copper conductors. The plug includes a body having a surface with several fiber-receiving grooves, and the plug fibers terminate along an intermediate section of the grooves. The receptacle includes a housing having an opening, and a plate which is slidably mounted inside the housing. The plate is biased toward the opening and has several more fiber-receiving grooves. The receptacle fibers approach the plate at an oblique angle causing them to bend as they contact the grooves of the plate. When the plug is inserted into the opening, its forward end contacts the plate and pushes it back. As the plate retracts, the terminal portions of the fibers in the receptacle (which are not secured to the plate) become free to flex, and position themselves in the corresponding grooves of the plug. Since the receptacle fibers are still bent, they are positively biased toward the plug fibers and move into forcible abutment with the terminal ends of the plug fibers. The connector advantageously incorporates V-groove technology into a multifiber format without requiring clamping of the terminal portions of the fibers.

20 Claims, 5 Drawing Sheets

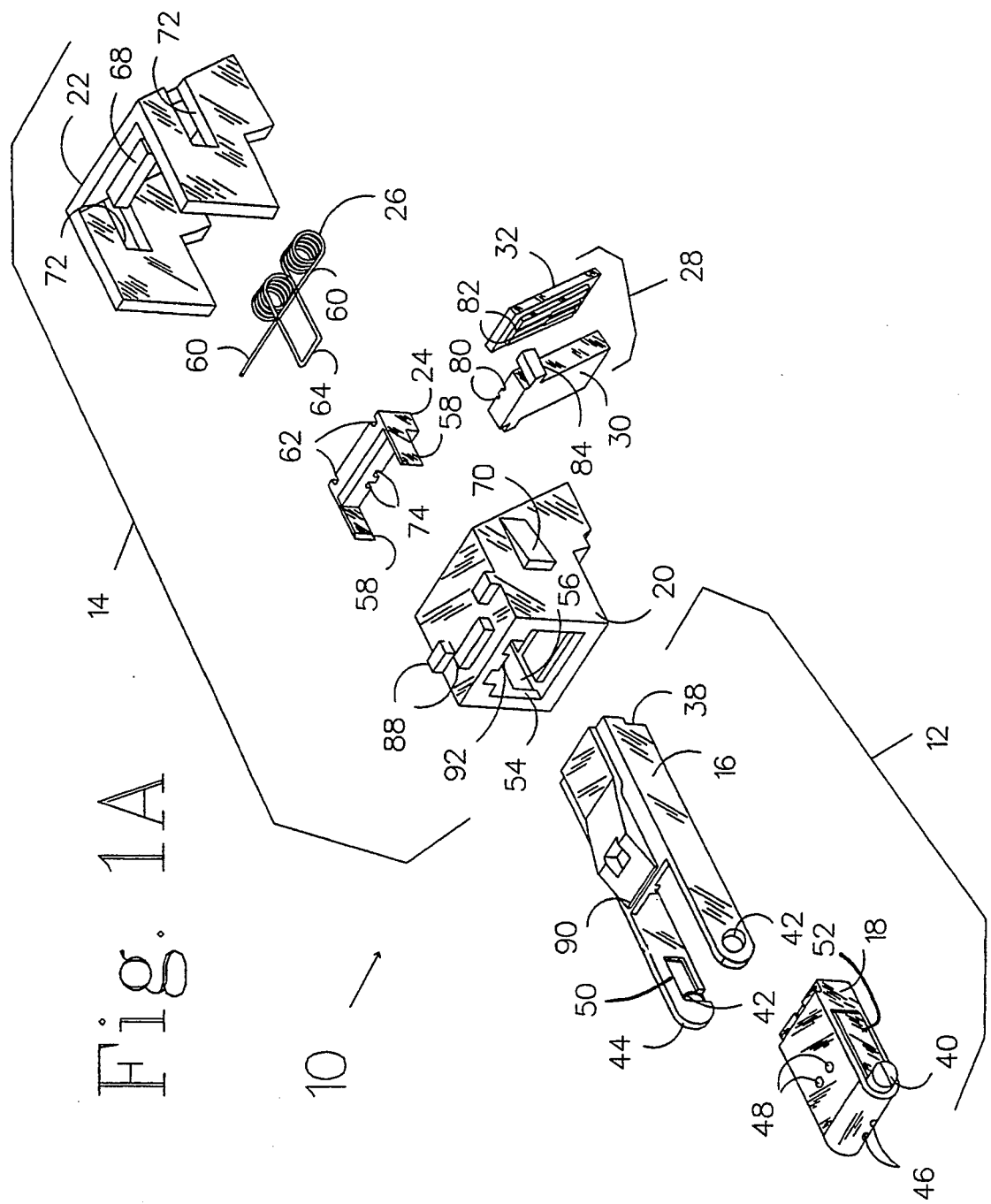

MODULAR MULTIFIBER CONNECTOR WITH PHONE-LIKE PLUG AND SOCKET

BACKGROUND OF THE INVENTION

1. Field of the Invention

The present invention generally relates to devices for interconnecting telecommunications lines, and more particularly to a modular connector for a plurality of optical fibers.

2. Description of the Prior Art

In the last few years, optical fibers have replaced copper wire as the preferred medium for carrying telecommunications signals. As with copper wire, it is necessary to provide for the interconnection of optical fibers, during installation, repair or replacement of the fibers. There are generally two kinds of interconnection devices, splices and connectors. The term "splice" usually refers to a device which provides a permanent connection between a pair of optical fibers. Many fiber optic splices employ plate elements having fiber-receiving V-shaped grooves, with means for clamping the terminal ends of a pair of fibers in a common groove. Some of these devices are designed to interconnect a plurality of pairs of fibers. See, e.g., U.S. Pat. No. 5,151,964. The term "connector," in contrast, usually refers to a device which may be engaged and disengaged repeatedly, often with a different plug or receptacle. The present invention is directed to such a device, although the term "connector" should not be construed in a limiting sense since the present invention may inherently provide a permanent, as well as temporary connection.

There are two primary types of commercially available fiber optic connectors, namely, ferrule connectors and biconic connectors. Ferrule connectors use a ferrule plug, typically ceramic, having a central bore which receives a single optical fiber. Biconic connectors use a plug in the shape of a truncated cone. Both connectors usually combine a pair of plugs fitting into a common socket or receptacle to provide a completed connection. The prior art also includes hybrid ferrule connector/splices, such as those shown in U.S. Pat. Nos. 4,986,626 and 5,159,655.

One area which has not been adequately addressed by the prior art, however, is the interconnection of a plurality of fiber optic pairs in a manner which provides for quick disconnection and reconnection. Since the plugs of ferrule and biconic connectors receive only a single fiber, a relatively large bank of such connectors must be provided to interconnect several fiber pairs. Alternatively, two or more plugs may be ganged together, e.g., in a duplex connector, as shown in U.S. Pat. No. 5,101,463. One drawback with these multifiber connectors is the poor interconnection densities that are achieved. While some ferrule designs have densities around 2 connections per square centimeter, this may be compared to densities of 4 connections or more per square centimeter in some copper connectors, such as an RJ45 connector. Some non-ferrule designs provide slightly improved densities, such as that described in U.S. Pat. No. 4,045,121, but that connector has far too many parts and is not easily installed. The '121 connector may also be contrasted with the RJ45 copper connector which possesses the desired characteristics of ease of installation, simplicity of use and quick disconnection.

Another problem in multifiber connectors is alignment of the interconnected fiber pair. For example, in the connector depicted in European Patent Application No. 514,722 (commonly referred to as an "MT" connector), pins are used to align the connector parts, but it is still difficult (i.e., expensive) to provide the strict tolerances required for high performance optical connections. Consequently, this connector exhibits relatively low performance. Other techniques have been used to improve alignment, such as the V-grooves shown in the '964 splice, but unfortunately, these techniques have not been suitably adapted for use in a disengageable connector. Furthermore, the MT connector is designed for pretermination of the fibers at the factory, i.e., it is very tedious to field install. It would, therefore, be desirable to devise a fiber optic connector which provides for the quick disconnection and reconnection of a plurality of optical fiber pairs, and which is simple to install and use. It would also be advantageous for the connector to have a reduced part count, exhibit an improved interconnection density, and provide precise alignment for enhanced performance.

SUMMARY OF THE INVENTION

The present invention provides a modular multifiber connector generally comprising a plug which is releasably mateable with a receptacle, the plug and receptacle each designed to receive the terminal ends of a plurality of optical fibers in side-by-side relationship. The plug has a body with a fiber-supporting surface having fiber-receiving grooves, and a plurality of fibers are secured to the plug with their ends terminating at an intermediate section of the grooves. The receptacle has an opening for receiving the plug, and includes a fiber-alignment plate which is slidably mounted within the receptacle housing and biased toward the opening, in an extended position. The plate also has fiber-receiving grooves extending to a forward edge, and another plurality of fibers are secured to the receptacle with their terminal ends extending beyond the forward edge, when the plate is in the extended position. The fibers are positioned at an angle with respect to the plate such that they bend under stress near their terminal portions.

As the plug is inserted into the receptacle, the grooves in the plug become aligned with the overhanging ends of the fibers terminating in the receptacle. When the plug is inserted further, its forward end pushes the sliding plate to a retracted position, allowing the bent fibers to relax slightly and lay down in the grooves of the plug. Once the plug is fully inserted, the terminal ends of the receptacle's fibers are in positive abutment with the ends of the plug's fibers, at the intermediate section of the grooves in the plug's fiber-supporting surface. The connector may be quickly engaged and disengaged, and is easy to install. The fibers may further be secured to the plug body by a plug core which is hingedly attached to the body in such a manner that the fibers may be removed from the grooves (e.g., for cleaning) by flipping the core from its operative position to an exposed position.

BRIEF DESCRIPTION OF THE DRAWINGS

The invention will best be understood by reference to the accompanying drawings, wherein:

FIGS. 1A and 1B are exploded top and bottom perspective views, respectively, of the modular multifiber connector of the present invention;

DESCRIPTION OF THE PREFERRED EMBODIMENT

Figure 1B:
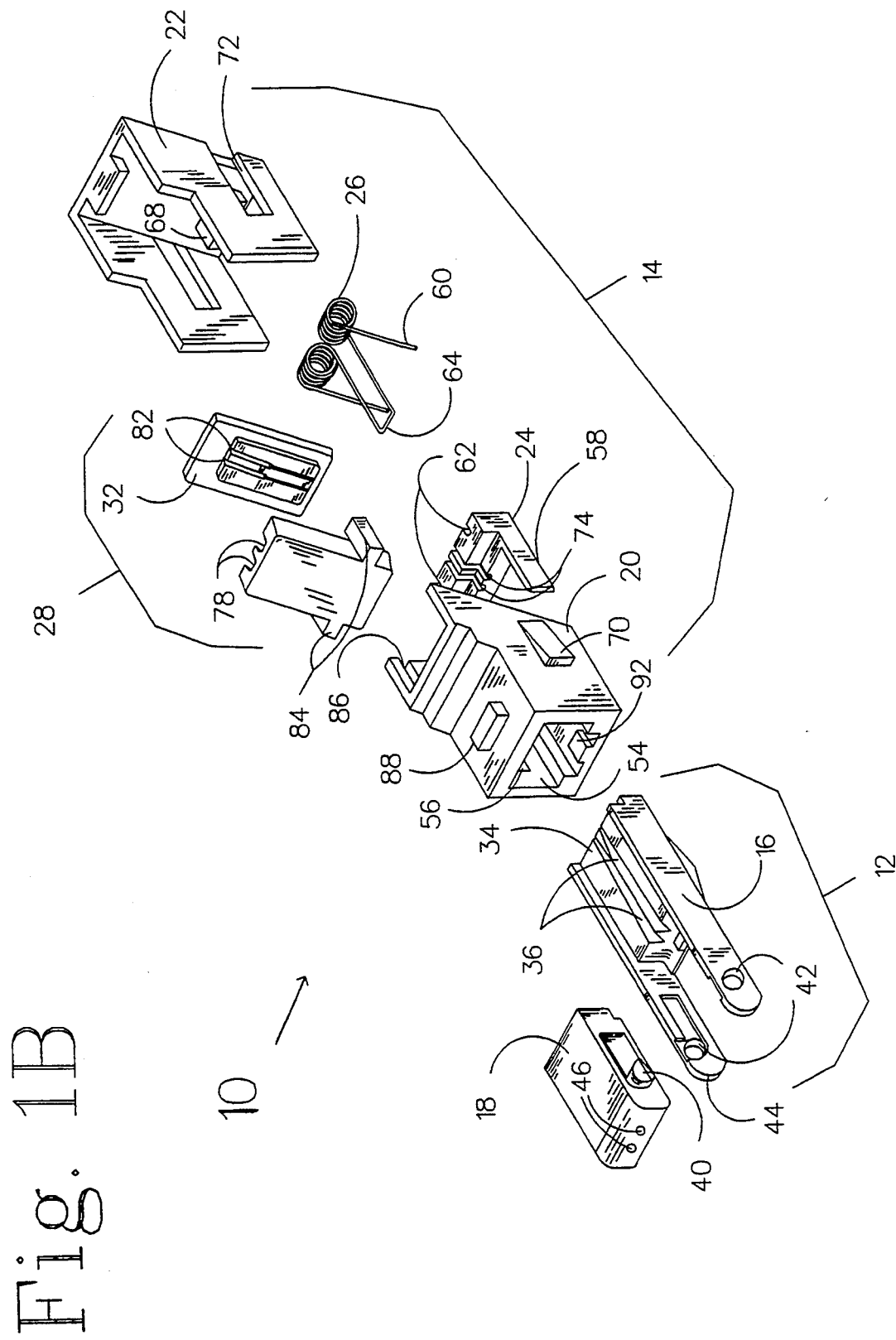

With reference now to the figures, and in particular with reference to FIGS. 1A and 1B, there is depicted the modular multifiber connector 10 of the present invention. Connector 10 is generally comprised of a plug 12 and a socket or receptacle 14. In the preferred embodiment, plug 12 includes a plug body 16 and plug core 18, while receptacle 14 includes a body or housing 20, a cover 22, a fiber-alignment plate 24, a spring 26, and a fiber guide 28 consisting of a guide body 30 and a guide cover 32. All of the components of connector 10 (except spring 26) may be formed of any durable material, preferably an injection moldable polymer such as polycarbonate or RADEL (a polyarylsulfone sold by Amoco). The material may include conductive fillers to render the components semiconductive in order to minimize triboelectric charging which can induce fiber end contamination.

Figure 2A:
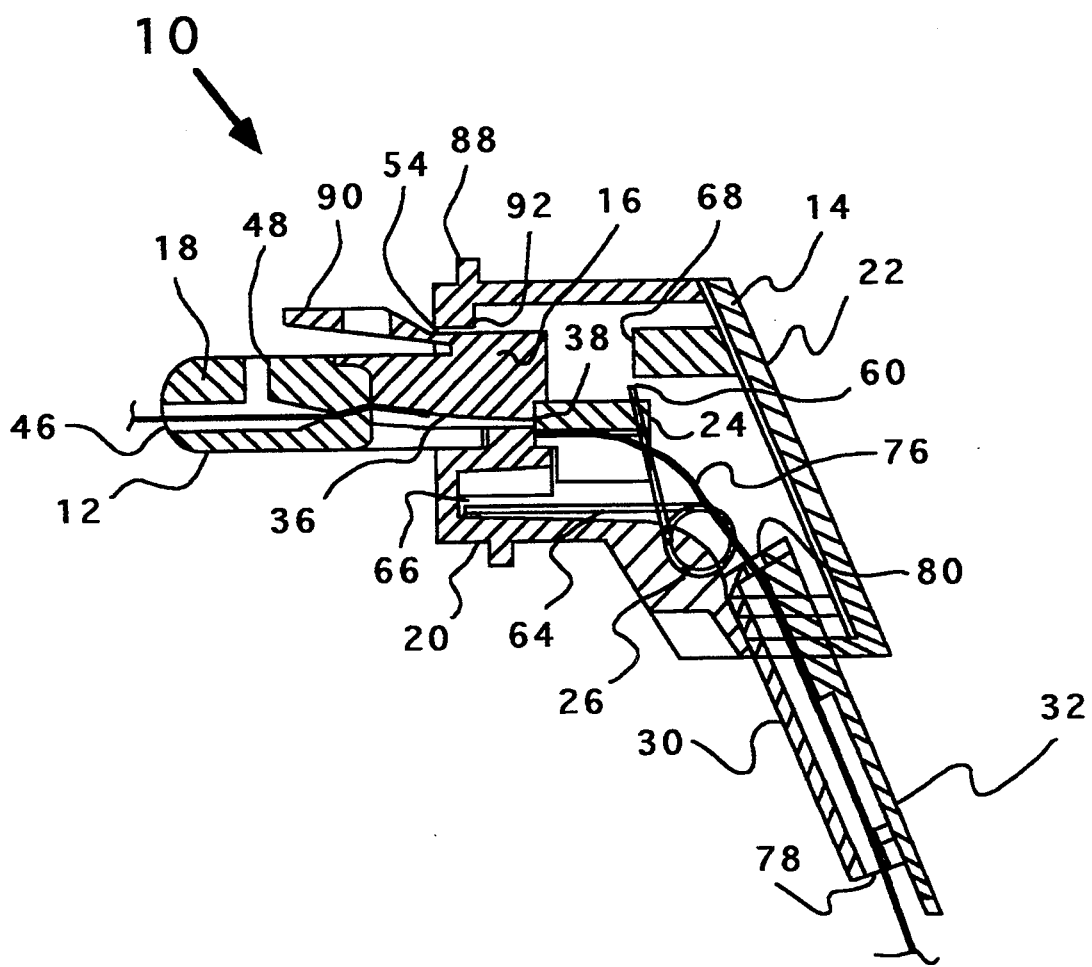
FIGS. 2A and 2B are cross-sectional views illustrating insertion of the plug of the present invention into the receptacle.

Plug body 16 has a fiber-supporting surface 34 with a plurality of fiber-receiving grooves 36 therein. One set of fibers to be interconnected are secured to body 16 in any convenient manner and, as best seen in FIG. 2A, the length of the terminal portions of the fibers are sized whereby the ends terminate at an intermediate section of the grooves. While it is necessary to ensure that body 16 provide a clearance space proximate grooves 36 (to accommodate the placement of the fibers from the receptacle), it is not necessary that the ends of the plug fibers be located at the exact center of grooves 36, but merely that the fibers be recessed so they do not extend to the forwardmost edge 38 of surface 34. This construction results in the fiber-to-fiber interface forming in the intermediate section of grooves 36 as discussed further below, and it also minimizes damage to or contamination of the fiber ends. Nonetheless, if the fibers do get dirty, means may be provided to allow movement of the fibers to a cleaning position. Specifically, in the preferred embodiment the fibers are secured by plug core 18 which is hingedly attached to body 16. Core 18 may be moved from its operative position (generally parallel with surface 34) where the fibers lie in grooves 36, to an exposed position (generally perpendicular to surface 34) where the fibers extend away from surface 36. In this position, the fiber ends may easily be cleaned, e.g., by applying a tape having pressure-sensitive adhesive to the fiber ends. The hinged attachment may be formed by molding pins or trunnions 40 on the sides of core 18 which mate with holes 42 in the distal ends of arms 44 of body 16.

Figure 2B:
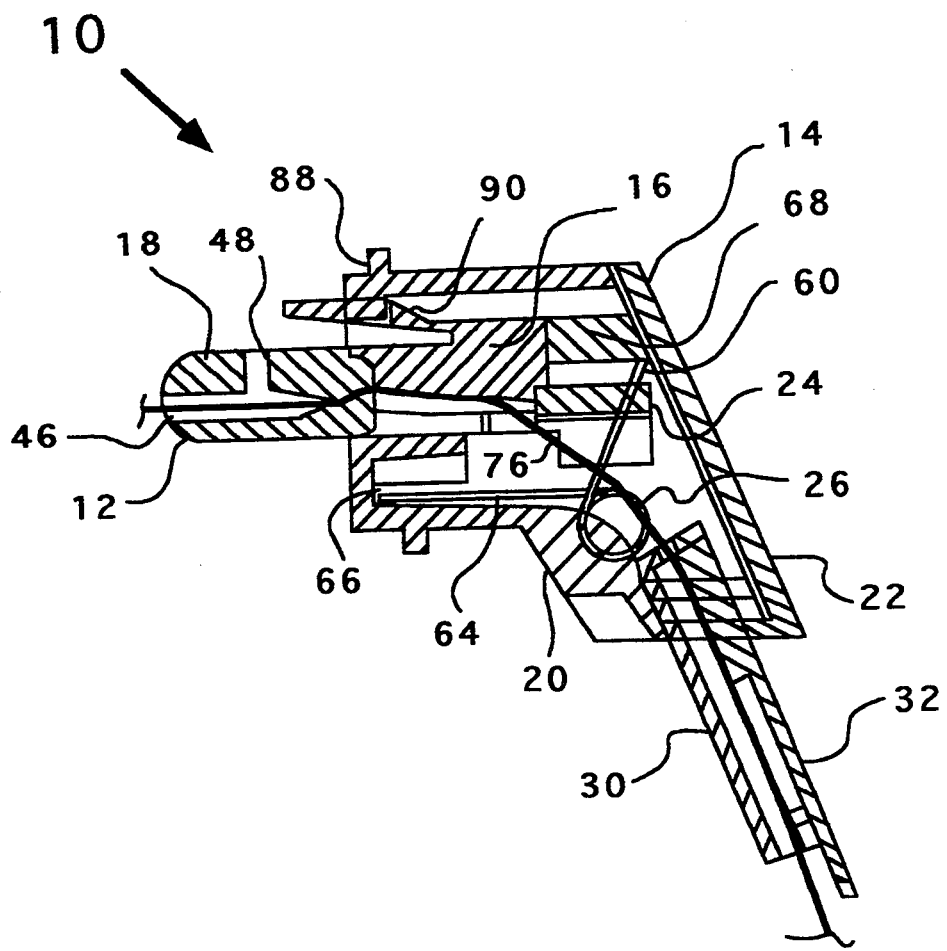

Core 18 is provided with a plurality of bores 46 for receiving the fibers. Another set of holes 48 in fluid communication with bores 46 may be used to inject an adhesive (epoxy resin) into bores 46 to firmly secure the fibers within the bores. The diameter of each bore 46 decreases just beyond holes 48 to accommodate the stripped terminal portion of the fibers. Means may be provided to releasably secure core 18 in its operative position; for example, a spline or rail 52 may be formed in core 18 for frictional engagement with a notch 50 in body 16, providing a snap-fit. As shown in FIGS. 2A and 2B, when core 18 is in the operative position, the fibers preferably exit bores 46 at a slight angle, thereby biasing the fiber ends towards the apex of the grooves. The grooves are preferably V-shaped and slightly concave.

Housing 20 of receptacle 14 has an opening 54 whose size and shape generally corresponds to that of the distal end of plug 12. Alignment plate 24 is mounted to the interior of housing 20 such that it may slide toward and away from opening 54; mounting may be accomplished by forming tracks 56 in the inner walls of housing 20, the tracks receiving the sides of plate 24. These sides have extensions 58 designed to limit the forward motion of plate 24 (toward opening 54). In the preferred embodiment, plate 24 is biased toward opening 54 by spring 26 having two tines 60 which fit in slots 62 of plate 24. As seen in FIGS. 2A and 2B, the central hairpin 64 of spring 26 is secured by a boss 66 formed along the interior of housing 20. Cover 22 serves to retain plate 24 and spring 26 within housing 20, and to protect the interior from airborne contaminants. A stop 68 is formed on the inside wall of cover 22 to limit insertion of plug 12. Cover 22 is releasably attached to housing 20 by any convenient means, such as latch lugs 70 which engage the clips formed on the sides of cover 22 by slots 72.

Plate 24 also has a plurality of fiber-receiving grooves 74, usually the same number of grooves that are on support surface 34. The shape of these grooves are not as critical as that of grooves 36, and are presently U-shaped. The fibers 76 which are to be pre-terminated in receptacle 14 are directed toward plate 24 by fiber guide 28. The body 30 of guide 28 has a plurality of entrance notches 78 and a plurality of exit notches 80 which accommodate and align the fibers. Notches 78 are design to receive the jacketed portion of the fibers and so are larger than notches 80 which receive the terminal portions of the fibers which have been stripped of the jacketing material. Cover 32 of fiber guide 28 has along its inner surface a plurality of fiber channels 82 having two sections; the channel sections closest to notches 78 are wider than the channel sections closest to notches 80, again due to the stripping of the fiber jacket. The transition from jacketed to unjacketed fiber in guide 28 may be used to ensure that the fibers are stripped and cleaved at an appropriate length, as discussed further below. Guide cover 32 may be attached to guide body 30 with an adhesive, which also serves to more securely hold fibers 76 in place.

Guide 28 may be attached to housing 20 several different ways; in the present embodiment, guide body 30 has a pair of integrally formed flanges or wings 84 which fit into slots 86 along the inner wall of housing 20 to form tongue-and-groove joints. Slots 86 are oriented with respect to tracks 56, and wings 84 are oriented with respect to body 30, whereby fibers 76 exiting guide 28 will be directed toward plate 24 at an oblique angle. In other words, the terminal portions of fibers 76 are not parallel with plate 24 or grooves 74. As noted below, this causes fibers 76 to bend or bow as they approach plate 24, which biases the fibers due to their resilience. A boss formed at the inside lower portion of housing cover 22 securely holds wings 84 in slots 86.

Assembly and installation of connector 10 is straightforward. Plug 12 is typically assembled in the factory, although it may easily be assembled in the field. In this regard, the term "pre-terminated" as used herein simply refers to the attachment of optical fibers to plug 12 or receptacle 14 regardless of whether such attachment occurs in the factory, the field, or elsewhere. It is also understood that plug 12 or receptacle 14 could be mounted on a jumper cable with any kind of optical connector at the other end of the fibers. It is recommended that fibers be used which have a longer life when exposed to indoor environments, such as the high-strength fibers available from Minnesota Mining and Manufacturing Co. (3M—assignee of the present invention). Those fibers have a conventional core and cladding which is surrounded by a novel three-layer construction. The innermost of these layers is constructed of a hard material (shore D hardness of 65 or more) and may be composed of any mixture of epoxy novolac, bisphenyl-a diglycidyl ether resin, and epoxy polysiloxane. The middle layer is softer, having a modulus in the range of 0.5–20 megapascals, and may be composed of acyrlated urethanes. The outermost layer has a modulus of 500–2500 megapascals and may also be composed of acyrlated urethanes. Those skilled in the art will also appreciate that the connector of the present invention can easily accommodate discrete optical fibers or multifiber ribbons.

Fibers which are to be pre-terminated to either plug 12 or receptacle 14 must be stripped, cleaved and cleaned. If the fibers are in the form of a ribbon which is part of a bundled group of ribbons in a cable, then a portion of the cable jacket must first be cut back to reveal the ribbons. Most cables have several protective layers, e.g., the ribbons are first surrounded by a thermal wrap, then an inner sheath, then a polyester tape layer, followed by an outer sheath, with one or more intervening layers of strength members (i.e., aramid fibers). Each of these layers must be removed to provide access to the fiber ribbons. Similar steps must be taken to remove the protective layers of a cable having a single discrete fiber. If a plurality of discrete fibers are to be interconnected, the craftsperson may optionally join the discrete fibers in a ribbon format, such as by using the FIBRLOK 2670 multifiber ribbon construction tool sold by 3M (FIBRLOK is a trademark of 3M).

After the fibers have been removed from the protective cable jacket, they are stripped. The stripped fibers are then ready for cleaving which may be accomplished using any one of several commercially available fiber cleavers, such as that shown in U.S. Pat. No. 5,024,363. The cleave length for attachment of the fibers to plug 12 is the distance from the front end of plug core 18 to the intermediate section of grooves 36 which, in the preferred embodiment, is about 6 mm. For attachment of fibers to receptacle 14, the cleave length is the arcuate distance from the forward end of guide 28 to the front end of plate 24 which, in the preferred embodiment, is about 22 mm. Stripping may be simplified by using the multi-fiber stripping tool shown in U.S. Pat. No. 4,850,108. This tool strips away the bonding material of the ribbon as well as the buffer coatings on each of the individual fibers. Any debris should be cleaned off the fibers using a lint-free cloth. Prior to removing the fibers from the cleaver, the craftsperson may inspect the fibers to confirm that the end faces on all fibers are acceptable, i.e., that they are smooth cleaves with no spikes. The fiber viewer disclosed in U.S. Pat. No. 5,210,647 may be used for this purpose. Once the craftsperson is satisfied that each of the fibers has an acceptable end face, the fibers may be removed from the cleaver. In the preferred embodiment, the fiber end faces are flat with a chamfered or beveled periphery (or at least partially beveled) to obtain the advantages associated with such a fiber end profile, as discussed more thoroughly in U.S. patent application Ser. Nos. 08/122,123 pending and 08/122,755 pending, filed concurrently with this application on Sep. 16, 1993. The fibers may optionally be cleaved so as to impart an angled end face, as taught in U.S. Pat. No. 5,048,908. In order to minimize insertion losses, the fibers should be inserted so that the orientation of the angled end faces of one set of fibers (i.e., in plug 12) complements the orientation of the angled end faces of the other set of fibers (i.e., in receptacle 14).

Final assembly of plug 12 comprises the simple steps of fully inserting the prepared fibers into bores 46, and holding them in place while an epoxy resin or other suitable adhesive is injected into holes 48. The ends of the fibers should terminate at the intermediate section of grooves 36, i.e., they should not extend all the way to edge 38. Completion of receptacle 14 is only slightly more complicated. The fibers 76 are placed in guide body 30 along with a small quantity of adhesive, and guide cover 32 is slowly lowered into place as the craftsperson ensures that the fibers are aligned with the respective channels 82. Plate 24 and spring 26 are positioned in housing 20 (this step may be performed at the factory). Guide 28 is then attached to receptacle housing 20 by sliding wings 84 into slots 86; prior to and during this step, however, the craftsperson should take care to keep the ends of fibers 76 under plate 24, in contact with the respective grooves 74. Once guide 28 is attached to housing 20, and fibers 76 are properly located in grooves 74, housing cover 22 may be snapped into place on housing 20.

Installation of connector 10 is equally effortless. Receptacle 14 is mounted to the desired surface by any convenient means. Tenons or bosses 88 on receptacle housing 20 may be used for mounting, similar to those on a conventional RJ45 plug (although plug 12 and receptacle 14 are preferably not compatible with the RJ45 standard to eliminate possible confusion). Other constructions could be molded into housing 20 for custom mounting. Several receptacles could also be mounted in a single module in a manner similar to that shown in U.S. Pat. No. 4,290,664. After receptacle 14 is mounted, the connection is completed by simply inserting plug 12 into opening 54. Plug 12 is releasably secured to receptacle 14 by a latch or clip 90 which catches on lug 92, again, similar to an RJ45 jack. Prior to insertion of plug 14, the craftsperson should inspect and clean grooves 36 of plug 14 as well as the fibers positioned therein. This is facilitated by swiveling plug core 18 to its exposed position.

FIG. 2A depicts partial insertion of the plug, while FIG. 2B depicts full insertion. In FIG. 2A, plate 24 is in its relaxed, extended position since the front edge 38 of surface 34 has not yet contacted plate 24. As plug 12 is inserted, edge 38 forcibly contacts and pushes plate 24 to the retracted position shown in FIG. 2B. As plate 24 retracts, the terminal ends of fibers 76 acquire limited freedom of movement and flex under their resilient stress toward the apex of grooves 36, eventually abutting the ends of the fibers held by plug 12. All force at the fiber-to-fiber interface comes from the resilience (elastic deformation) of bowed fibers 76 which maintains a continuous compressive load between the ends. It will be appreciated that, unlike any prior art fiber connector, the terminal portions of the fibers (of both the plug and receptacle) are loosely supported and may move transversely within grooves 36, i.e., they are not clamped or otherwise fixed to any surface. The fibers are, however, biased toward the apex of grooves 36. Fibers 76 of receptacle 14 are naturally so biased due to the oblique angle of approach to the grooves, while the fibers held by plug 14 are similarly biased due to the slight exit angle from bores 46 as mentioned above. This helps ensure that the fibers do not slip or buckle.

Figure 3:
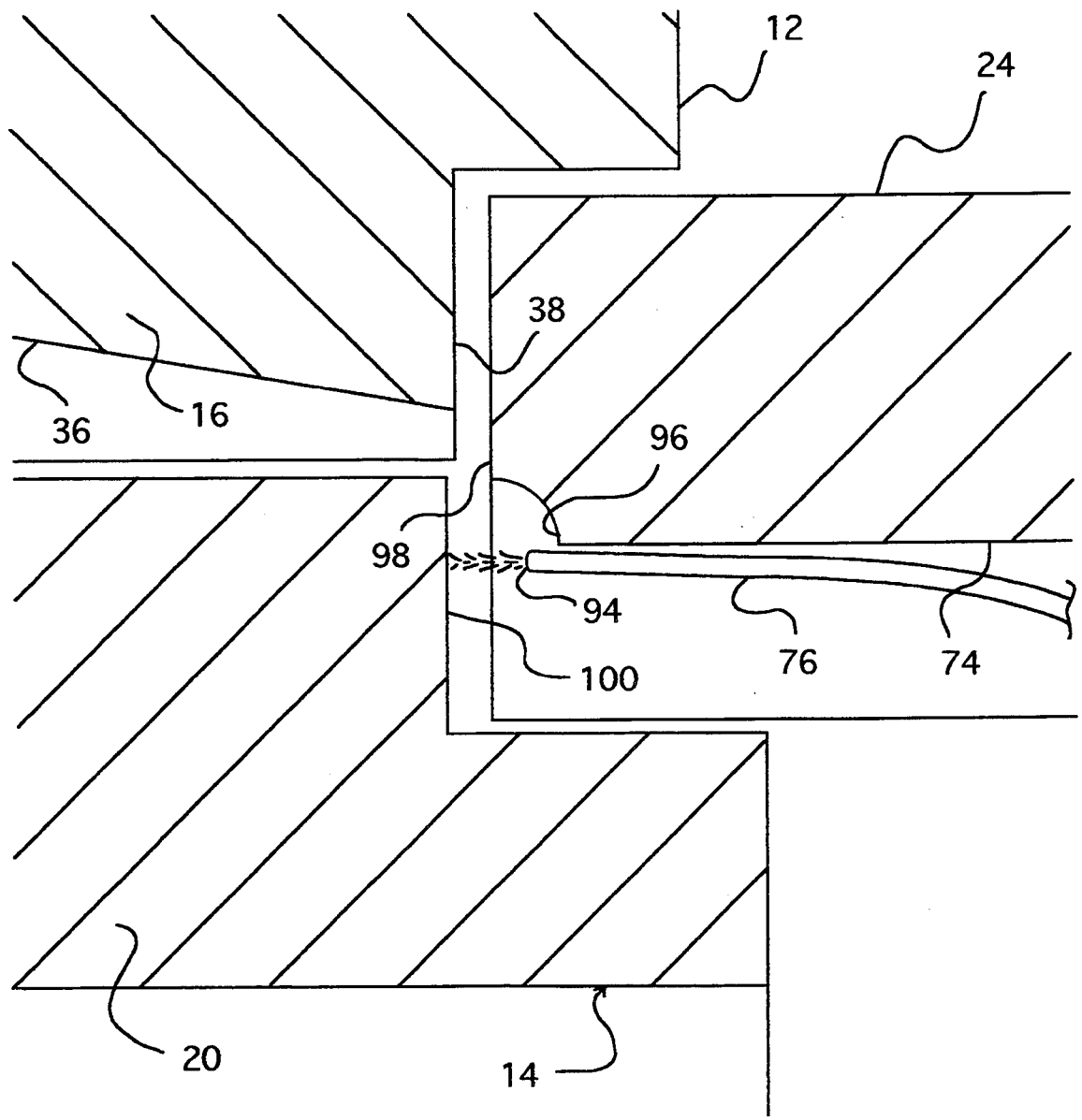
FIG. 3 is an enlarged detail sectional view of FIG. 2A illustrating the light-shutoff feature and the overhanging fiber ends in the receptacle of the present invention.

Other features of connector 10 may be understood with reference to FIG. 3, which is an enlarged detail sectional view of FIG. 2A. FIG. 3 depicts how the end 94 of fiber 76 rests beyond a ledge 96 formed at the front end 98 of plate 24. By locating fiber 76 in this manner, end 94 does not scrape against groove 74 as plate 24 is retracted, thus avoiding contamination of the fiber end which might occur if dust or other debris had collected in the groove. In the preferred embodiment, ledge 96 is recessed from front end 98 to allow for light stop 100 (discussed below) which would otherwise forcibly abut end 94 and possibly damage it if fiber 76 extended beyond end 98. Those skilled in the art will appreciate, however, that ledge 96 need not be recessed, i.e., it could coincide with end 98, and fiber end 94 could extend beyond front end 98 if light stop 100 were removed. It will also be appreciated that the apex of groove 74 is transversely displaced with respect to groove 36 to ensure that fiber 76 gently lowers itself into groove 36 as plate 24 is retracted, i.e., end 94 of fiber 76 will not get stuck on front end 38 of surface 34.

FIG. 3 also illustrates how a block is formed against the interior wall of housing 20 to form a light stop 100, which is directly in front of end 94 of fiber 76 when plate 24 is in its extended position. This is an added safety feature since it prevents light from escaping from housing 20; thus, if someone views the interior of housing 20 through opening 54 while there is an active signal on the fibers, that person will not be exposed to laser light emanating from the fibers. Stop 100 need not be completely opaque, but it is preferably not completely transparent.

The dimensions of the various components of connector 10 may vary considerably depending upon the desired application. The following approximate dimensions are considered exemplary. Plug body 16 has an overall length of 30 mm, a width of 13 mm, and a thickness of 6.5 mm. Plug core 18 has a length of 16 mm, a width of 9 mm, and a thickness of 6.5 mm. V-grooves 36 are 12 mm long and have a maximum depth of 2 mm which suitably accommodates most conventional optical fibers. The interior angle of the V-grooves should not be too narrow since this might result in excess friction with the fibers, but it also should not be too wide since this would not keep the fibers guided properly. A 90° interior angle is believed to be a good compromise. Guide 28 of receptacle 14 is 25 mm×10 mm×5 mm. The front face of receptacle 14 (with opening 54) is 18 mm×16 mm. Its overall height and depth are 28 mm and 31 mm. Plate 24 is 15 mm×6 mm×3.5 mm, and its extensions 58 add another 4 mm of width. Grooves 74 are 1.5 mm wide.

Besides providing for quick and easy connection and disconnection, connector 10 has several other advantages. As previously mentioned, it may easily be pre-terminated in the field as well as the factory. Even if the fibers 76 in receptacle 14 do not terminate at exactly the desired position shown in FIG. 3 (or if the fibers each terminate at slightly different positions) there will still be full fiber-to-fiber contact in the completed connection since the resilient stress of the bent fibers 76 provides a positive abutment force; in other words, the tolerance in the relative positions of a fiber pair is eased by the slack in receptacle fibers 76. Plug 14 is also inherently pull-proof due to this biasing of the receptacle fibers. Tolerances are also not critical in the transverse position of a given fiber pair since V-grooves 36 serve to align the fibers and the fibers are biased toward the apex of the grooves. In this regard, it may be noted that the only significant guideline in the manufacture of the components is the surface finish of grooves 36 (i.e., that the walls be smooth and the groove angle be well-defined), and this finish is easy to fabricate using standard injection molding techniques. Also, since receptacle fibers 76 enter housing 20 at an oblique angle (up to 90°), it requires very little depth for mounting. Moreover, the mounting methods are compatible with those of RJ45 jacks. Finally, the reduced part count and the fact that all parts (except spring 26) can be injection molded contribute to a very low cost connector. Several of these advantages relate to the fact that the present invention provides for interconnection of the fibers without the necessity of clamping the terminal portions of the fibers.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, although only two fibers pairs are shown connected in the figures, connector 10 could accommodate practically any number of fibers (or just a single pair). A hybrid connector could also combine the present invention with electrical connections by using the copper contacts of an RJ45 connector. In either of the foregoing modifications, the plug and/or receptacle could be keyed (mechanically polarized) for the specific connection configuration. Finally, receptacle 14 could house stub fibers having corresponding splice elements similar to the design shown in U.S. Pat. No. 4,986,626. It is therefore contemplated that such modifications can be made without departing from the spirit or scope of the present invention as defined in the appended claims.

I claim:

1. A pre-terminated fiber optic cable comprising:
   at least one optical fiber having a terminal end;
   a plug body having a surface with at least one fiber-receiving groove, said groove having an intermediate section, and said terminal end of said fiber being positioned in said intermediate section of said groove, said body being adapted to mate with an external receptacle; and
   means for attaching a portion of said optical fiber to said plug body.

2. The pre-terminated fiber optic cable of claim 1 wherein said plug body provides a clearance space adjacent said fiber-receiving groove proximate said intermediate section thereof.

3. The pre-terminated fiber optic cable of claim 1 wherein:
   said attaching means comprises a core member having means for securing said fiber to said core member; and
   said core member is hingedly attached to said plug body and movable between an operative position wherein said fiber lies in said groove, and an exposed position wherein said fiber is displaced from said groove.

4. The pre-terminated fiber optic cable of claim 3 wherein:
said core member has at least one bore extending therethrough, said bore receiving said fiber; and
when said core member is in said operative position, said fiber exits said bore at an oblique angle with respect to said groove.

5. A plug for terminating an optical fiber, comprising:
a plug body having a surface with at least one fiber-receiving groove, said body being adapted to mate with an external receptacle; and
a plug core having means for securing the fiber to said plug core, said plug core being hingedly attached to said plug body and movable between an operative position and an exposed position.

6. The plug of claim 5 wherein said plug core has:
at least one bore extending therethrough for receiving the fiber; and
at least one hole in fluid communication with said bore.

7. The plug of claim 5 wherein said plug body provides a clearance space adjacent said fiber-receiving groove.

8. A pre-terminated fiber optic cable utilizing the plug of claim 6 wherein:
said bore receives said fiber; and
when said plug core is in said operative position, said fiber exits said bore at an oblique angle with respect to said groove of said plug body.

9. A receptacle for receiving the terminal portion of an optical fiber, comprising:
a housing having an interior and an opening to said interior;
a plate member slidably mounted to said interior of said housing, said plate member having at least one fiber-receiving groove;
means for biasing said plate member toward said opening of said housing; and
means for attaching the optical fiber to said housing whereby the terminal portion of said fiber may be received in said groove.

10. The receptacle of claim 9 wherein said plate member slides in a direction generally parallel with said fiber-receiving groove.

11. The receptacle of claim 9 wherein said housing interior has attached thereto a light stop member which is interposed between said groove of said plate member and said opening of said housing.

12. A pre-terminated fiber optic cable utilizing the receptacle of claim 9, wherein said attaching means directs the terminal portion of the fiber toward said plate member at an oblique angle with respect to said fiber-receiving groove, thereby causing said fiber to bend.

13. The pre-terminated fiber optic cable of claim 12, wherein:
said plate member has a ledge;
said groove in said plate member has an end adjacent said ledge; and
the terminal end of the fiber extends beyond said ledge.

14. A pre-terminated fiber optic cable comprising:
at least one optical fiber having a terminal end;
a receptacle housing having an interior and an opening to said interior;
means for attaching said optical fiber to said housing;
means for aligning said terminal end of said optical fiber toward said opening, said alignment means being movable between an extended position proximate said opening and a retracted position distant from said opening; and
a light stop member attached to said interior of said receptacle housing, interposed between said opening thereof and said terminal end of said optical fiber when said aligning means is in said extended position.

15. The pre-terminated fiber optic cable of claim 14 wherein said aligning means comprises a plate member slidably mounted to said interior of said housing, said plate member having at least one fiber-receiving groove and said optical fiber being located in said groove when said plate member is in said extended position, and further comprising:
means for biasing said plate member toward said opening of said housing.

16. The pre-terminated fiber optic cable of claim 14 wherein, when said aligning means moves from said extend position to said retracted position, said end of said optical fiber moves with respect to said light stop member.

17. A modular optical fiber connector comprising:
first and second optical fibers, each having a terminal end;
a plug member having
a surface with a first fiber-receiving groove, and
first means locating said terminal end of said first optical fiber in said first groove;
a receptacle having
a housing,
a plate member, inside said housing, with a second fiber-receiving groove,
an opening in said housing to allow insertion of said plug member proximate said plate member, and
second means locating said terminal end of said second optical fiber in said second groove; and
at least one of said first and second optical fibers being loosely supported in its corresponding groove.

18. A fiber optic connector comprising:
first and second optical fibers, each having a terminal end, and at least one of said ends having a periphery which is at least partially beveled;
plug means for securing said first optical fiber;
receptacle means for securing said second optical fiber, and for receiving said plug means;
means for aligning said terminal end of said first optical fiber with said terminal end of said second optical fiber; and
means for maintaining a continuous compressive load between said terminal ends by providing elastic deformation of at least one of said optical fibers.

19. The fiber optic connector of claim 18 wherein said aligning means includes a plate member having fiber-receiving grooves therein.

20. The fiber optic connector of claim 18 wherein said partially beveled end has a flat central region.

* * * * *